(12) United States Patent
Shimouse et al.

(10) Patent No.: US 8,158,706 B2
(45) Date of Patent: *Apr. 17, 2012

(54) POLYPROPYLENE RESIN COMPOSITION, RESIN MOLDED PART AND PRODUCTION METHOD THEREOF

(75) Inventors: Masashi Shimouse, Mie (JP); Yukihito Zanka, Mie (JP); Takayuki Sato, Kanagawa (JP); Mineyuki Saotome, Kanagawa (JP); Sinichi Takaragi, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/021,088

(22) Filed: Feb. 4, 2011

(65) Prior Publication Data

US 2011/0127696 A1  Jun. 2, 2011

Related U.S. Application Data

(62) Division of application No. 11/960,063, filed on Dec. 19, 2007, now Pat. No. 7,923,501.

(30) Foreign Application Priority Data

Dec. 27, 2006 (JP) ................................. 2006-352451

(51) Int. Cl.
*C08K 3/34* (2006.01)
*C08K 3/40* (2006.01)

(52) U.S. Cl. ........ 524/449; 524/451; 524/847; 524/505; 524/515; 525/540; 526/351

(58) Field of Classification Search ................... 524/449, 524/451, 847, 505, 515; 525/240; 526/351
See application file for complete search history.

(56) References Cited

U.S. PATENT DOCUMENTS

| 6,916,886 | B2 | 7/2005 | Morioka et al. | |
|---|---|---|---|---|
| 7,923,501 | B2 * | 4/2011 | Shimouse et al. | 524/449 |
| 2005/0228141 | A1 | 10/2005 | Moritomi et al. | |
| 2006/0160942 | A1 | 7/2006 | Kanzaki | |

FOREIGN PATENT DOCUMENTS

| DE | 10 2006 001 127 A1 | 7/2006 |
|---|---|---|
| EP | 0 879 853 A1 | 11/1998 |
| EP | 1 086 986 A1 | 3/2001 |
| JP | 2003-253083 A | 9/2003 |
| JP | 2004/18647 A | 1/2004 |
| JP | 2006-219667 A | 8/2006 |
| JP | 2007-284668 * | 1/2007 |
| JP | 2007-284668 | 11/2007 |
| WO | WO 91/04257 | 4/1991 |
| WO | WO 2006/075637 A1 | 7/2006 |

OTHER PUBLICATIONS

JIS K 7210, Testing Method for Melt Flow Rate of Thermoplastic, 1976, pp. 590-604.
JIS K 7203, Testing Method for Flexural Properties of Rigid Plastics, 1982, pp. 303-311.
JIS K 7110, Method of Izod Impact Test for Rigid Plastics, 1994, pp. 177-203.
ASTM D 1238-04, Standard Test method for Melt Flow Rates of Thermoplastics by Extrusion Plastometer, Apr. 2004, pp. 269-281.
Office Action in JP Appln No. 2006-352451 dated Aug. 23, 2011.

* cited by examiner

*Primary Examiner* — Robert D. Harlan
(74) *Attorney, Agent, or Firm* — Foley & Lardner LLP

(57) ABSTRACT

A polypropylene resin composition contains 2 to 15 wt % of a moldability improver (A) and 85 to 98 wt % of a polypropylene resin (B). The moldability improver (A) is formed of propylene block copolymers (A-1) and (A-2). Each of the propylene block copolymers (A-1) and (A-2) has a crystalline propylene polymer component (A-11), (A-21) and a propylene-ethylene random copolymer component (A-12), (A-22). The propylene block copolymer (A-1) is characterized in that the melt flow rate of the crystalline propylene polymer component (A-11) is high, whereas the propylene block copolymer (A-2) is characterized in that the content ratio of the propylene-ethylene random copolymer component (A-22) is high. The polypropylene resin (B) is formed of a propylene-ethylene block copolymer (B-1), at least one of an ethylene elastomer and a styrene elastomer (B-2) and an inorganic filler (B-3).

6 Claims, No Drawings

POLYPROPYLENE RESIN COMPOSITION, RESIN MOLDED PART AND PRODUCTION METHOD THEREOF

CROSS REFERENCE TO RELATED APPLICATIONS

This application is a Divisional of U.S. patent application Ser. No. 11/960,063, filed Dec. 19, 2007, which claims priority to Japanese Application No. 2006-352451, filed Dec. 27, 2006, the entire contents of each of the aforementioned applications are incorporated herein by reference.

BACKGROUND OF THE INVENTION

The present invention relates to a polypropylene resin composition that contains a moldability improver to attain good moldability and prevent molding defects such as flow marks and voids for improvement in molding appearance. The present invention also relates to a molded part of the polypropylene resin composition for suitable use as an automotive exterior part and a production method thereof.

For the purposes of weight reduction and process flexibility, resin materials are widely used for automotive exterior parts etc. Although many of the resin molded parts are given painting or coating for industrial designs, some of the resin molded parts have their resin surfaces unpainted or uncoated in view of design and cost effects. It is thus desired that, for appearance improvements, the unpainted or uncoated surface portions of the resin molded parts sustain no or minimal molding defects such as so-called flow marks or tiger marks (wavy or rimple marks on the surfaces of the resin molded parts) and voids (spherical air voids in the thick and corner portions of the resin molded parts) due to improper flow of the resin materials into the molds.

Japanese Laid-Open Patent Publication No. 2003-253083 proposes a polypropylene resin composition for an automotive exterior part, which contains 100 parts by weight of propylene-ethylene block copolymer (A) having an intrinsic viscosity of 4 dl/g or higher as determined by extraction with xylene at 25° C. and 0.03 to 3 parts by weight of alkylbenzoate and hindered amine compounds (B). This proposed resin composition allows an improvement in the appearance of the resultant resin molded part.

SUMMARY OF THE INVENTION

In the above-proposed polypropylene resin composition, however, the use of the polymer material (A) of specific intrinsic viscosity causes an increase in material cost and, when a painting or coating is applied to the resin molded part, leads to excess performance. Further, the addition of the alkylbenzoate and hindered amine compounds (B) causes painting or coating deteriorations such as yellow discoloration and improper adhesion depending on the kind of the painting or coating so that careful consideration must be given to the combined use of the resin composition and the painting or coating.

With the increasing globalization of the economic activity, there is a strong demand to prepare molding resin compositions from general-purpose polypropylene resin base materials available anywhere in the world. However, any known moldability improvers have to be added in large amounts for molding appearance improvements and exert large influence on the properties of the general-purpose polypropylene resin materials.

It is therefore an object of the present invention to provide a polypropylene resin composition prepared by adding a suitable moldability improver to a general-purpose polypropylene resin so as to attain good moldability and prevent molding defects such as flow marks and voids for improvement in molding appearance without causing material cost increase and property deterioration etc.

It is also an object of the present invention to provide a molded part of the polypropylene resin composition and a production method thereof.

As a result of extensive research, it has been found that the combined use of two specific propylene block copolymers as a moldability improver produces a large molding appearance improvement (molding defect prevention) effect on a general-purpose polypropylene resin. This moldability improver can be added in a small amount as a resin masterbatch at the stage of molding, rather than added at the stage of compounding, so as to prepare a polypropylene resin composition at minimal cost for the production of a resin molded part without painting or coating. The present invention is based on such a finding.

According to a first aspect of the present invention, there is provided a polypropylene resin composition comprising 2 to 15 wt % of a moldability improver (A) and 85 to 98 wt % of a polypropylene resin (B) based on the total weight of the polypropylene resin composition, the moldability improver (A) containing 80 to 95 wt % of a propylene block copolymer (A-1) and 5 to 20 wt % of a propylene block copolymer (A-2) based on the total weight of the moldability improver (A), the propylene block copolymer (A-1) including 80 to 95 wt % of a crystalline propylene polymer component (A-11) and 5 to 20 wt % of a propylene-ethylene random copolymer component (A-12) based on the total weight of the propylene block copolymer (A-1) and satisfying the following properties: (a-11) the crystalline propylene polymer component (A-11) has a melt flow rate of 300 g/10 minutes or higher; (a-12) the propylene-ethylene random copolymer component (A-12) has an ethylene content of 20 to 70 wt %; (a-13) the propylene-ethylene random copolymer component (A-12) has an intrinsic viscosity of 6.5 dl/g or higher; and (a-14) the propylene block copolymer (A-1) has an overall melt flow rate of 80 g/10 minutes or higher, the propylene block copolymer (A-2) including 30 to 65 wt % of a crystalline propylene polymer component (A-21) and 35 to 70 wt % of a propylene-ethylene random copolymer component (A-22) based on the total weight of the propylene block copolymer (A-2) and satisfying the following properties: (a-21) the crystalline propylene polymer component (A-21) has a melt flow rate of 20 g/10 minutes or higher; (a-22) the propylene-ethylene random copolymer component (A-22) has an ethylene content of 20 to 70 wt %; (a-23) the propylene-ethylene random copolymer component (A-22) has an intrinsic viscosity of 4.0 to 9.0 dl/g or higher; and (a-24) the propylene block copolymer (A-2) has an overall melt flow rate of 0.1 to 79 g/10 minutes, the polypropylene resin (B) containing 55 to 85 wt % of a propylene-ethylene block copolymer (B-1), 5 to 20 wt % of at least one of an ethylene elastomer and a styrene elastomer (B-2) and 10 to 25 wt % of an inorganic filler (B-3) based on the total weight of the polypropylene resin (B), and the propylene-ethylene block copolymer (B-1) including less than 35 wt % of a propylene-ethylene random copolymer component (B-12) based on the total weight of the propylene-ethylene block copolymer (B-1).

According to a second aspect of the present invention, there is provided a molded part of the polypropylene resin composition.

According to a third aspect of the present invention, there is provided a method of producing a molded part of the polypropylene resin composition, comprising: melt-kneading the polypropylene resin and the moldability improver within an injection molding machine; and injection-molding the polypropylene resin composition by the injection molding machine.

The other objects and features of the present invention will also become understood from the following description.

DESCRIPTIONS OF THE EMBODIMENTS

The present invention will be described below in detail.

A polypropylene resin composition according to the present invention (hereinafter just referred to as "polypropylene resin composition") is formed of a moldability improver (A), a polypropylene resin (B), and optionally, a color masterbatch (C) and is suitably used for a resin molded part.

Moldability Improver (A)

The moldability improver (A) is prepared by melt-kneading two kinds of propylene block copolymers (A-1) and (A-2) and added to provide a molding appearance improvement effect on the polypropylene resin composition and thereby prevent or reduce the generation of molding defects such as flow marks and voids in the molded part of the polypropylene resin composition.

The propylene block copolymer (A-1) has a high-flowability crystalline propylene homopolymer component (A-11) and a high-molecular-weight propylene-ethylene random copolymer component (A-12) as a rubber component and satisfies the following first to fourth specific properties (a-11) to (a-14) for improvements in resin flowability (anti-blocking property) and molding appearance. Herein, the crystalline propylene homopolymer component (A-11) generally consists of a homopolymer of propylene but may contain a small amount e.g. 0.5 wt % of a copolymer of propylene and other α-olefin so far as it does not impair the properties of the propylene block copolymer (A-1) such as the crystallinity of the propylene homopolymer component (A-11). The propylene-ethylene random copolymer component (A-12) may also contain a small amount e.g. 0.5 wt % of a copolymer of propylene, ethylene and other α-olefin so far as it does not impair the properties of the propylene block copolymer (A-1).

The content ratio of the crystalline propylene homopolymer component (A-11) is generally 80 to 95 wt %, preferably 85 to 95 wt %, based on the total weight of the propylene block copolymer (A-1), whereas the content ratio of the propylene-ethylene random copolymer component (A-12) is generally 5 to 20 wt %, preferably 5 to 15 wt %, based on the total weight of the propylene block copolymer (A-1). The method of determining the content ratios of the polymer components (A-11) and (A-12) will be explained later. If the content ratio of the propylene-ethylene random copolymer component (A-12) to the propylene block copolymer (A-1) is less than 5 wt %, the polypropylene resin composition cannot obtain a sufficient molding appearance improvement effect. If the content ratio of the propylene-ethylene random copolymer component (A-12) to the propylene block copolymer (A-1) exceeds 20 wt %, the polypropylene resin composition tends to form a gel so that there arises an adverse effect on the appearance of the molded part of the polypropylene resin composition.

Further, the first property (a-11) of the propylene block copolymer (A-1) is that the melt flow rate MFR of the crystalline propylene homopolymer component (A-11) is 300 g/10 minutes or higher, preferably 450 to 3000 g/10 minutes, more preferably 500 to 2000 g/10 minutes, as determined at 230° C. under a load of 21.18 N according to JIS K7210. In the case of forming the crystalline propylene homopolymer component (A-11) in a plurality of polymerization steps as will be explained later, the melt flow rate MFR of the crystalline propylene homopolymer component (A-11) is determined as that of the final polymerization product after the completion of all of the polymerization steps. If the melt flow rate MFR of the crystalline propylene homopolymer component (A-11) is lower than 300 g/10 minutes, the polypropylene resin composition undesirably decreases in flowability. Herein, the melt flow rate MFR of the crystalline propylene homopolymer component (A-11) can be adjusted as appropriate by controlling the molecular weight of the crystalline propylene homopolymer component (A-11) with the addition of hydrogen as a chain transfer agent during polymerization.

The second property (a-12) of the propylene block copolymer (A-1) is that the ethylene content of the propylene-ethylene random copolymer component (A-12) is 20 to 70 wt %, preferably 20 to 65 wt %, more preferably 30 to 60 wt %. The method of determining the ethylene content of the polymer component (A-12) will be explained later. If the ethylene content of the propylene-ethylene random copolymer component (A-12) is less than 20 wt %, the polypropylene resin composition cannot obtain a sufficient molding appearance improvement effect so that the molded part of the polypropylene resin composition sustains remarkable appearance defects, notably flow marks. If the ethylene content of the propylene-ethylene random copolymer component (A-12) exceeds 70 wt %, the polypropylene resin composition undesirably decreases in impact resistance.

The third property (a-13) of the propylene block copolymer (A-1) is that the intrinsic viscosity $[\eta]_{copoly}$ of the propylene-ethylene random copolymer component (A-12) is 6.5 dl/g or higher, preferably 7.0 to 15 dl/g, more preferably 7.5 to 10 dl/g. The method of determining the intrinsic viscosity $[\eta]_{copoly}$ of the polymer component (A-12) will be explained later. If the intrinsic viscosity $[\eta]_{copoly}$ of the propylene-ethylene random copolymer component (A-12) is lower than 6.5 dl/g, the polypropylene resin composition cannot obtain a sufficient molding appearance improvement effect.

The fourth property (a-14) of the propylene block copolymer (A-1) is that the overall melt flow rate MFR of the propylene block copolymer (A-1) is 80 g/10 minutes or higher, preferably 80 to 250 g/10 minutes, as determined at 230° C. under a load of 21.18 N according to JIS K7210. If the overall melt flow rate MFR of the propylene block copolymer (A-1) is lower than 80 g/10 minutes, the polypropylene resin composition undesirably decreases in moldability. If the overall melt flow rate MFR of the propylene block copolymer (A-1) exceeds 250 g/10 minutes, it is likely that the polypropylene resin composition will decrease in impact resistance and mechanical strength.

On the other hand, the propylene block copolymer (A-2) has a crystalline propylene homopolymer component (A-21) and a propylene-ethylene random copolymer component (A-22) as a rubber component and satisfies the following first to fourth specific properties (a-21) to (a-24). Herein, the crystalline propylene homopolymer component (A-21) generally consists of a homopolymer of propylene but may contain a small amount e.g. 0.5 wt % of a copolymer of propylene and other α-olefin so far as it does not impair the properties of the propylene block copolymer (A-2) such as the crystallinity of the propylene homopolymer component (A-21). The propylene-ethylene random copolymer component (A-22) may also contain a small amount e.g. 0.5 wt % of a copolymer of propylene, ethylene and other α-olefin so far as it does not impair the properties of the propylene block copolymer (A-2).

The content ratio of the crystalline propylene homopolymer component (A-21) is generally 30 to 65 wt %, preferably 40 to 60 wt %, based on the total weight of the propylene block copolymer (A-2), whereas the content ratio of the propylene-ethylene random copolymer component (A-22) is generally 35 to 70 wt %, preferably 40 to 60 wt %, based on the total weight of the propylene block copolymer (A-2). The method of determining the content ratios of the polymer components (A-21) and (A-22) will be explained later. If the content ratio of the propylene-ethylene random copolymer component (A-22) to the propylene block copolymer (A-2) is less than 30 wt %, the moldability of the polypropylene resin composition cannot be improved to a sufficient level so that there arises a need to use a large amount of other additive or additives. The use of such a large amount of additive or additives deteriorates the properties (e.g. moldability) of the polypropylene resin composition. If the content ratio of the propylene-ethylene random copolymer component (A-22) to the propylene block copolymer (A-2) exceeds 65 wt %, the propylene block copolymer (A-2) cannot be uniformly dispersed into the polypropylene resin composition during molding and adversely affects the appearance of the molded part of the polypropylene resin composition.

Further, the first property (a-21) of the propylene block copolymer (A-2) is that the melt flow rate MFR of the crystalline propylene homopolymer component (A-21) is 20 g/10 minutes or higher, preferably 20 to 300 g/10 minutes, more preferably 60 to 200 g/10 minutes, as determined at 230° C. under a load of 21.18 N according to JIS K7210. In the case of forming the crystalline propylene homopolymer component (A-21) in a plurality of polymerization steps as will be explained later, the melt flow rate MFR of the crystalline propylene homopolymer component (A-21) is determined as that of the final polymerization product after the completion of all of the polymerization steps. If the melt flow rate MFR of the crystalline propylene homopolymer component (A-21) is lower than 20 g/10 minutes, the polypropylene resin composition undesirably decreases in flowability. Herein, the melt flow rate MFR of the crystalline propylene homopolymer component (A-21) can be adjusted by controlling the molecular weight of the crystalline propylene homopolymer component (A-21) with the addition of hydrogen as a chain transfer agent during polymerization.

The second property (a-22) of the propylene block copolymer (A-2) is that the ethylene content of the propylene-ethylene random copolymer component (A-22) is 20 to 70 wt %, preferably 26 to 60 wt %, more preferably 30 to 50 wt %. The method of determining the ethylene content of the polymer component (A-22) will be explained later. If the ethylene content of the propylene-ethylene random copolymer component (A-12) is less than 20 wt %, the polypropylene resin composition cannot obtain a sufficient molding appearance improvement effect so that the molded part of the polypropylene resin composition sustains remarkable appearance defects, notably voids. If the ethylene content of the propylene-ethylene random copolymer component (A-12) exceeds 70 wt %, the propylene block copolymer (A-2) may not be uniformly dispersed into the polypropylene resin composition during molding.

The third property (a-23) of the propylene block copolymer (A-2) is that the intrinsic viscosity $[\eta]_{copoly}$ of the propylene-ethylene random copolymer component (A-22) is 4.0 to 9.0 dl/g or higher, preferably 4.1 to 6.5 dl/g, more preferably 4.5 to 6.0 dl/g. The method of determining the intrinsic viscosity $[\eta]_{copoly}$ of the polymer component (A-22) will be explained later. If the intrinsic viscosity $[\eta]_{copoly}$ of the propylene-ethylene random copolymer component (A-22) is lower than 4.0 dl/g, the polypropylene resin composition cannot obtain a sufficient molding appearance improvement effect. If the intrinsic viscosity $[\eta]_{copoly}$ of the propylene-ethylene random copolymer component (A-22) exceeds 9.0 dl/g, the overall melt flow rate MFR of the propylene block copolymer (A-2) becomes lowered so that the polypropylene resin composition undesirably decreases in moldability.

The fourth property (a-24) of the propylene block copolymer (A-2) is that the overall melt flow rate MFR of the propylene block copolymer (A-2) is 0.1 to 79 g/10 minutes, preferably 0.2 to 40 g/10 minutes, more preferably 2.1 to 40 g/10 minutes, as determined at 230° C. under a load of 21.18 N according to JIS K7210. If the overall melt flow rate MFR of the propylene block copolymer (A-2) is lower than 0.1 g/10 minutes, the polypropylene resin composition undesirably decreases in moldability. If the overall melt flow rate MFR of the propylene block copolymer (A-2) exceeds 79 g/10 minutes, the polypropylene resin composition cannot obtain a sufficient molding appearance improvement effect.

Polymer Content and Property Measurements

The content ratio of the rubber component (A-12), (A-22) in the propylene block copolymer (A-1), (A-2), the ethylene content of the rubber component (A-12), (A-22) and the intrinsic viscosity $[\eta]_{copoly}$ of the rubber component (A-12), (A-22) can be measured by the following methods as disclosed in Japanese Laid-Open Patent Publication No. 2006-219667 and U.S. Pat. No. 6,916,886, which is incorporated by reference.

The content ratio measurement is made by sampling the polymer component, separating the sample into fractions by Cross Fractionation Chromatography (CFC), i.e., Temperature-Rising Elution Fractionation with Gas Permeation Chromatography (GPC), and then, quantifying the fractions by Fourier Transform Infrared (FT-IR) spectroscopy.

More specifically, the CFC/FT-IR measurement system is made up of a Cross Fractionation Chromatograph (CFC "T-100" manufactured by Dia Instruments Co., Ltd.) and a Fourier Transform Infrared Spectrometer (FT-IR "1760X" manufactured by Perkin Elmer, Inc. with an optical path length of 1 mm and an optical path width of 5 mm) by removing a fixed wavelength infrared spectrophotometer from the CFC and connecting the FT-IR to an elution outlet of the CFC via a transfer line. In the later stage of the CFC, three GPC columns ("AD806MS" manufactured by Showa Denko K.K.) are connected in series. The transfer line between the CFC and the FT-IR is set up with a length of 1 m and kept at a temperature of 140° C. throughout the measurement. The flow cell of the FT-IR is also kept at a temperature of 140° C. throughout the measurement.

The Cross Fractionation Chromatography is carried out under the following conditions.
[CFC Measurement Conditions]
(1) Solvent: orthodichlorobenzene (ODCB)
(2) Sample concentration: 4 mg/ml
(3) Injection amount: 0.4 ml
(4) Crystallization: temperature decrease from 140° C. to 40° C. over about 40 minutes.
(5) Fractionation temperatures: 40° C., 100° C. and 140° C.
(6) Elution solvent flow rate: 1 ml/min
In the Temperature-Rising Elution Fractionation, the sample is separated into three fractions: fraction 1 eluted at not higher than 40° C., fraction 2 eluted at from 40° C. to 100° C. and fraction 3 eluted at from 100° C. to 140° C. Herein, the proportions of the fractions 1, 2 and 3 are defined as $W_{40}$, $W_{100}$ and $W_{140}$, respectively, in units of wt % in such a manner as to satisfy the relationship of $W_{40}+W_{100}+$ $W_{140}$=100. Each of the fractions 1, 2 and 3 is automatically transferred to the FT-IR via the transfer line as it is without treating.

After the initiation of elution of the sample solution from the GPC columns of the CFC, the Fourier Transform Infrared Spectroscopy is carried out under the following conditions to obtain GPC-IR data of the fractions 1, 2 and 3.
[FT-IR Measurement Conditions]
(1) Detector: MCT
(2) Resolution: 8 cm$^{-1}$
(3) Measurement interval: 0.2 minutes (12 seconds)
(4) Scan number per measurement: 15 times The elution amounts and molecular weight distributions of the fractions 1, 2 and 3 are determined through analysis of the GPC-IR data. Herein, the elution amounts of the fractions 1, 2 and 3 are standardized in such a manner that the sum of the elution amounts of the fractions is 100%. The content ratio of the rubber component (A-12), (A-22) and the ethylene content of the rubber component (A-12), (A-22) are derived from the following equations:

$$W_{coploy} = W_{40} \times \frac{A_{40}}{B_{40}} + W_{100} \times \frac{A_{100}}{B_{100}}$$

$$W_{ethyl} = \frac{(W_{40} \times A_{40} + W_{100} \times A_{100})}{W_{copoly}}$$

where $W_{copoly}$ is the content ratio (wt %) of the rubber component (A-12), (A-22) to the propylene block copolymer (A-1), (A-2); $W_{ethyl}$ is the ethylene content (wt %) of the rubber component (A-12), (A-22); $W_{40}$ and $W_{100}$ are the elution proportions of the fractions 1 and 2, respectively; $A_{40}$ and $A_{100}$ are the average ethylene contents of the fractions 1 and 2; and $B_{40}$ and $B_{100}$ are the ethylene contents of the rubber components in the fractions 1 and 2, respectively.

The intrinsic viscosity measurement is made as follows using a Uberode type viscometer and a decalin solvent at a temperature of 135° C. The intrinsic viscosity $[\eta]_{homo}$ of the crystalline propylene homopolymer component (A-11), (A-21) is first measured by sampling the polymer component (A-11), (A-21) from the reactor after the completion of polymerization. Subsequently, the rubber component (A-12), (A-22) is formed by polymerization to yield the propylene block copolymer (A-1), (A-2) as the final reaction product. The intrinsic viscosity $[\eta]_F$ of the propylene block copolymer (A-1), (A-2) is measured by sampling the propylene block copolymer (A-1), (A-2) from the reactor after the completion of polymerization. The intrinsic viscosity $[\eta]_{copoly}$ of the propylene-ethylene random copolymer component (A-12), (A-22) is then derived from the following equation.

$$[\eta]_F = \frac{(100 - Wc)}{100} \times [\eta]_{homo} + \frac{Wc}{100} \times [\eta]_{copoly}$$

Preparation of Propylene Block Copolymers

The propylene block copolymers (A-1) and (A-2) are a reaction mixture of the polymer components (A-11) and (A-12) and a reaction mixture of the polymer components (A-21) and (A-22), respectively. In other words, the propylene block copolymer (A-1), (A-2) can be prepared by a sequential polymerization procedure: a first polymerization process in which the crystalline propylene homopolymer component (A-11), (A-21) is formed by homopolymerization of propylene; and a second polymerization process in which the propylene-ethylene random copolymer component (A-12), (A-22) is formed by random copolymerization of propylene and ethylene subsequently to the first polymerization process. Each of the first and second polymerization processes can be carried out in a single process step or in two or more process steps. The conditions of the process steps may be the same or different in the first and second polymerization processes.

There is no particular restriction on the polymerization catalyst. Any know polymerization catalyst can be used. Examples of the polymerization catalyst are a so-called Ziegler-Natta catalyst (a combination of an organoaluminum compound and a solid substance containing titanium, magnesium, halogen and an electron-donating compound as essential ingredients) and a metallocene catalyst. The Ziegler-Natta catalyst, which generally causes less polymerization chain transfer, is more preferred in view of the fact that the molding appearance improvement effect of the moldability improver (A) increases with the intrinsic viscosity $[\eta]_{copoly}$ of the rubber component (A-12), (A-22).

There is no particular restriction on the polymerization method. The propylene block copolymers (A-1) and (A-2) can be prepared by slurry or solution polymerization (polymerization of propylene using an inert hydrocarbon solvent such as hexane, heptane, octane, benzene or toluene), gas-phase polymerization (polymerization of propylene in gas phase) or bulk polymerization (polymerization of propylene using propylene itself as a polymerization solvent). Further, the polymerization can be carried out by either a batch, continuous semi-batch process operation. It is desirable to use the slurry or gas-phase polymerization process, which is feasible under high hydrogen concentration conditions, for the preparation of the propylene block copolymer (A-1) in which the melt flow rate MFR of the crystalline propylene homopolymer component (A-11) is characteristically high. For the preparation of the propylene block copolymer (A-2) in which the content ratio of the rubber component (A-22) is characteristically high, by contrast, the slurry polymerization process may not be suitable in view of the possibility of dissolution of the rubber component (A-22) into the polymerization solvent. It is desirable to use either the gas-phase polymerization process or the hybrid polymerization process of bulk polymerization and gas-phase polymerization for the preparation of the propylene block copolymer (A-2).

There is no particular restriction on the polymerization reactor. The polymerization reactor can be of any shape and structure. Examples of the polymerization reactor are: a vessel type reactor with an agitator, a tubular reactor; a fluidized-bed reactor; and a horizontal reactor with a stirring vane.

For example, the propylene block copolymers (A-1) and (A-2) can be prepared by the following sequential slurry polymerization procedure. The crystalline propylene homopolymer component (A-11), (A-21) is first formed by slurry polymerization under the conditions of: a polymerization temperature of 50 to 100° C., preferably 60 to 80° C.; a monomer partial pressure (propylene partial pressure) of 0.15 to 2.0 MPa, preferably 0.15 to 1.0 MPa; a residence time of 2 to 10 hours, preferably 2 to 5 hours, in the presence of the polymerization catalyst and hydrogen as the chain transfer agent. In order to impart a sufficiently high melt flow rate MFR to the crystalline propylene homopolymer component (A-11) of the propylene block copolymer (A-1), it is desirable to supply a relatively high concentration of hydrogen as the chain transfer agent although it depends on the kind of the polymerization catalyst. Subsequently, the propylene-ethylene random copolymer component (A-12), (A-22) is formed by slurry polymerization under the conditions of: a polymerization temperature of 40 to 80° C., preferably 50 to 80° C.; and a monomer partial pressure (propylene/ethylene partial pressure) of 0.1 to 1.0 MPa, preferably 0.1 to 0.5 MPa, in the presence of the polymerization catalyst and hydrogen as the chain transfer agent. In this case, the same polymerization catalyst is used in the first and second slurry polymerization processes. In order to impart a sufficiently high intrinsic viscosity $[\eta]_{copoly}$ to the propylene-ethylene random copolymer component (A-12) of the propylene block copolymer (A-1), it is desirable to supply a low concentration of hydrogen as the chain transfer agent although it depends on the polymerization method and the kind of the polymerization catalyst. It is also desirable to regulate the supply of ethylene monomer as appropriate in order to control the ethylene content of the rubber component (A-12), (A-22) to within the above specific range.

Alternatively, the propylene block copolymers (A-1) and (A-2) can be prepared by the following sequential gas-phase or bulk polymerization procedure. The crystalline propylene homopolymer component (A-11), (A-21) is first formed by gas-phase or bulk polymerization under the conditions of: a polymerization temperature of 50 to 100° C., preferably 50 to 70° C.; and a monomer partial pressure (propylene partial pressure) of 0.5 to 4.5 MPa, preferably 1.0 to 3.0 MPa. Subsequently, the propylene-ethylene random copolymer component (A-12), (A-22) is formed by gas-phase or bulk polymerization under the conditions of: a polymerization temperature of 50 to 150° C., preferably 50 to 90° C.; and a monomer partial pressure (propylene/ethylene partial pressure) of 0.3 to 4.5 MPa, preferably 0.5 to 3.5 MPa.

For the preparation of the propylene block copolymer (A-2) in which the content ratio of the rubber component (A-22) is high, it is desirable to control the conditions of the first and second polymerization processes (i.e. decrease the polymerization temperature, propylene monomer partial pressure and polymerization time in the first polymerization process and increase the polymerization temperature, propylene and ethylene monomer partial pressures and polymerization time in the second polymerization process) so as to limit the catalyst reactivity to a relatively low level during the first polymerization process and maintain the catalyst reactivity at a relatively high level during the second polymerization process. However, too high polymerization time causes deterioration in polymer particle flowability. It is thus desirable to control the polymerization temperature to a relatively low degree so as to maintain good polymer flowability.

In order to impart good particle flowability to the polymer composition and avoid gel generation due to improper dispersion of the rubber component (A-12), (A-22), an active-hydrogen-containing compound is preferably added in an amount of 0.2 to 2 times the moles of the catalyst (organoaluminum compound) after the completion of the first polymerization process and before the initiation of or during the second polymerization step, regardless of the polymerization method (i.e. whether slurry polymerization, gas-phase polymerization or bulk polymerization is conducted). Examples of the active-hydrogen-containing compound are water, alcohols, phenols, aldehydes, carboxylic acids, acid amides, ammonia and amines.

In order to obtain a sufficient molding appearance improvement effect, the moldability improver (A) contains 80 to 95 wt % of the propylene block copolymer (A-1) and 5 to 20 wt % of the propylene block copolymer (A-2), preferably 80 to 90 wt % of the propylene block copolymer (A-1) and 10 to 20 wt % of the propylene block copolymer (A-2), based on the total weight of the moldability improver (A). If the propylene block copolymer (A-1) is contained in too large amount, the polypropylene resin composition cannot obtain a sufficient molding appearance improvement effect so that the molded part of the polypropylene resin composition sustains molding defects, notably voids. If the propylene block copolymer (A-2) is contained in too large amount, the polypropylene resin composition decreases in bending elasticity modulus.

The moldablity improver (A) may include any other additive or additives such as an antioxidant, a heat stabilizer, a weather resistance stabilizer (anti-weathering agent), a ultraviolet stabilizer, a nucleating agent, a dispersant, a pigment, an anti-static agent, a slip additive and a metal deactivator as long as they do not impair the properties of the moldablity improver (A).

The moldablity improver (A) can be prepared by kneading the above components (A-1) and (A-2) with the use of an extruder (e.g. a uniaxial extruder or a biaxial extruder) or a kneader (e.g. a Banbury mixer, a mixing roll or a Brabender plastograph) at a temperature of 180 to 250° C. It is desirable to use the extruder, particularly biaxial extruder, for the preparation of the moldablity improver (A).

Polypropylene Resin (B)

The polypropylene resin (B) is prepared by kneading a propylene-ethylene block copolymer (B-1), an elastomer (B-2) and an inorganic filler (B-3) as a general-purpose polypropylene resin base material to be modified with little property changes by the moldablity improver (A).

The propylene-ethylene block copolymer (B-1) has a crystalline propylene polymer component (B-11) and a propylene-ethylene random copolymer component (B-12).

The crystalline propylene polymer component (B-11) generally consists of a homopolymer of polypropylene or, in some cases, may contain a small amount of copolymer of propylene and other α-olefin. Preferably, the crystalline propylene polymer component (B-11) has a high density. Further, the crystalline propylene polymer component (B-11) generally has a crystallinity of 90% or higher, preferably 95 to 100%, in terms of the isotactic index as determined by extraction with boiling n-heptane. If the crystallinity of the propylene polymer component (B-11) is too low, the polypropylene resin composition undesirably decreases in mechanical strength, notably bending elastic modulus.

The propylene-ethylene random copolymer component (B-12) generally consists of a random copolymer of propylene and ethylene as a rubber component. The content ratio of the propylene-ethylene random copolymer component (B-12) is generally less than 35 wt %, preferably 10 to 20 wt %, based on the total weight of the propylene-ethylene block copolymer (B-1). The content ratio of the polymer component (B-12) can be determined in the same manner to those of the polymer components (A-12) and (A-22) as explained above. If the content ratio of the propylene-ethylene random copolymer component (B-12) to the propylene-ethylene block copolymer (B-1) is greater than or equal to 35 wt %, the polypropylene resin composition undesirably decreases in bending elastic modulus.

Preferably, the propylene-ethylene block copolymer (B-1) has a melt flow rate MFR of 10 to 200 g/10 minutes, more preferably 15 to 150 g/10 minutes, as determined at 230° C. under a load of 21.18 N according to JIS K7210. If the melt flow rate MFR of the propylene-ethylene block copolymer (B-1) is lower than 10 g/10 minutes, the polypropylene resin composition undesirably decreases in moldability. If the melt flow rate MFR of the propylene-ethylene block copolymer (B-1) exceeds 200 g/10 minutes, the polypropylene resin composition undesirably decreases in impact resistance.

The propylene-ethylene block copolymer (B-1) can be prepared by any known method. The preparation method of the propylene-ethylene block copolymer (B-1) may be the same as those of the propylene block copolymers (A-1) and (A-2) of the moldability improver (A). It is desirable to prepare the propylene-ethylene block copolymer (B-1) in the presence of a highly stereospecific polymerization catalyst. In the case of preparing the propylene-ethylene block copolymer (B-1) with a relatively high content of the propylene-ethylene random copolymer component (B-12), it is desirable to use fluidized-bed gas-phase polymerization. In order to avoid resin sticking and clogging problems for ease of polymerization control, an electron-donating compound may be added during the later polymerization reaction.

The elastomer (B-2) is either an ethylene elastomer, a styrene elastomer or a combination thereof. Examples of the elastomer (B-2) are: ethylene-α-olefin copolymer elastomers such as ethylene-propylene copolymer elastomer (EPR), ethylene-butene copolymer elastomer (EBR), ethylene-hexene copolymer elastomer (HER) and ethylene-octene copolymer elastomer (EOR); ethylene-α-olefin-diene terpolymer elastomers (EPDM) such as ethylene-propylene-ethylidene-norbornene terpolymer elastomer, ethylene-propylene-butadiene copolymer elastomer and ethylene-propylene-isoprene copolymer elastomer; and styrene polymer elastomers such as styrene-butadiene-styrene triblock copolymer elastomer (SBS), styrene-isoprene-styrene triblock copolymer elastomer (SIS), hydrogeneated styrene-butadiene-styrene triblock copolymer elastomer (SEBS) and hydrogenated styrene-isoprene-styrene triblock copolymer elastomer (SEPS). It is noted that the hydrogeneated styrene-butadiene-styrene triblock copolymer elastomer is abbreviated as "SEBS" because it has a main polymer chain of styrene-ethylene-butene-styrene monomer sequence. These elastomers can be used alone or in combination of two or more thereof.

The ethylene-α-olefin copolymer elastomer can be formed by polymerization of ethylene and α-olefin in the presence of a polymerization catalyst. Examples of the polymerization catalyst are titanium compounds such as titanium halide, organic aluminum-magnesium complexes such as alkylaluminum-magnesium complex, so-called Ziegler catalysts such as alkylaluminum and alkylaluminum chloride and metallocene compounds as disclosed in International Patent Publication WO 91/04257. The polymerization can be carried out by a fluidized-bed gas-phase polymerization process, a solution polymerization process, a slurry polymerization process etc. Any commercially available product of the elastomer can be used. Examples of the elastomer product are: those of ED series available from JSR Corp.; TAFMER P series and TAFMER A series available from Mitsui Chemicals, Inc.; ENGAGE EG series available from DuPont Dow Co.; and TUFTEC H series available from Asahi Kasei Corporation.

The hydrogeneated styrene triblock copolymer elastomers SEBS and SEPS can be prepared by a general anionic living polymerization method. One example of the anionic living polymerization method is to produce a triblock copolymer by successive polymerization of styrene, butadiene and styrene and then hydrogenate the triblock copolymer. Another example of the anionic living polymerization method is to produce a styrene-butadiene diblock copolymer, treat the diblock copolymer with a coupling agent to form a triblock copolymer, and then, hydrogenate the triblock copolymer. The hydrogeneated styrene triblock copolymer elastomer SEPS can be prepared by the same method as above using isoprene instead of butadiene.

The elastomer (B-2) preferably has a melt flow rate MFR of 0.5 to 150 g/10 minutes, more preferably 0.7 to 150 g/10 minutes, still more preferably 0.7 to 80 g/10 minutes, as determined at 230° C. under a load of 21.18 N according to JIS K7210 in order to suitably use the molded part of the polypropylene resin composition as an automotive exterior part.

The inorganic filler (B-3) is added to increase the bending elasticity modulus of the polypropylene resin composition and decrease the linear expansion coefficient of the polypropylene resin composition.

There is no particular restriction on the composition and form of the inorganic filler (B-3). Any commercially available inorganic filler can be used. Examples of the inorganic filler (B-3) are: tabular fillers such as talc, mica and montmorillonite; fibrous fillers such as short glass fiber, long glass fiber, carbon fiber, aramid fiber, alumina fiber, boron fiber and zonolite; acicular fillers (whiskers) such as potassium titanate, magnesium oxysulfate, silicon nitride, aluminum borate, basic magnesium sulfate, zinc oxide, wollastonite and calcium carbonate; granulated fillers such as precipitated calcium carbonate, heavy calcium carbonate and magnesium carbonate; balloon fillers such as glass balloon. Of these, talc, mica, glass fiber or whisker is preferred in view of the balance between properties and cost. The talc may be surface treated with an organic titatate coupling agent, an organic silane coupling agent, a modified polyolefin (grafted with an unsaturated carboxylic acid or anhydride thereof), a fatty acid, a fatty acid metal salt, a fatty acid ester etc. in order to improve the adhesion and dispersability of the talc to the polymer.

The polypropylene resin (B) contains 55 to 85 wt % of the propylene-ethylene block copolymer (B-1), 5 to 20 wt % of the elastomer (B-2) and 10 to 25 wt % of the inorganic filler (B-3), more preferably 60 to 70 wt % of the propylene-ethylene block copolymer (B-1), 10 to 18 wt % of the elastomer (B-2) and 15 to 25 wt % of the inorganic filler (B-3), based on the total weight of the polypropylene resin (B). If the content ratios of these components (B-1), (B-2) and (B-3) are not in the above-specified ranges, the polypropylene resin composition undesirably decreases in impact resistance or bending elasticity modulus.

The polypropylene resin (B) can be prepared by kneading the above components (B-1), (B-2) and (B-3) with the use of an extruder (e.g. a uniaxial extruder or a biaxial extruder) or a kneader (e.g. a Banbury mixer, a mixing roll or a Brabender plastograph) at a temperature of 180 to 250° C. It is desirable to use the extruder, particularly biaxial extruder, for the preparation of the polypropylene resin (B).

Color Masterbatch (C)

The color masterbatch (C) is prepared by kneading a high concentration of dry color into a thermoplastic resin (as a carrier polymer) and forming the resultant resin mixture into a pellet. Examples of the thermoplastic resin are propylene resins such as homopolypropylene, random polypropylene and impact polypropylene, low-density polyethylene, polyethylene wax, polypropylene wax, maleic modified polyethylene wax and maleic modified polypropylene wax. Examples of the dry color are: black colorants such as carbon black; white colorants such as titanium oxide; red colorants such as redironoxide; green colorants such as sintered green; and blue colorants such as phthalocyanine and ultramarine blue.

In view of color dispersion and coloring effects, the dry color is contained in an amount of about 20 to 50 wt % based on the total weight of the color masterbatch (C).

Additives (D)

Any other additive or additives (D) may optionally be contained in the polypropylene resin composition as long as they do not impair the properties of the polypropylene resin composition. Examples of the additives (D) are a phenolic or phosphoric antioxidant, a hindered-amine, benzophenone or benzotriazole weather resistance stabilizer (anti-weathering agent) and a nucleating agent such as an organoaluminum compound or organophosphorous compound.

Polypropylene Resin Composition

The polypropylene resin composition contains 2 to 15 wt % of the moldability improver (A) and 85 to 98 wt % of the polypropylene resin (B), preferably 3 to 12 wt % of the moldability improver (A) and 88 to 97 wt % of the polypropylene resin (B), based on the total weight of the polypropylene resin composition. If the content ratio of the moldability improver (A) is less than 2 wt %, the polypropylene resin composition cannot obtain a sufficient molding appearance improvement effect. If the content ratio of the moldability improver (A) exceeds 15 wt %, the polypropylene resin composition undesirably deteriorates in impact resistance.

In the case of adding the color masterbatch (C) to the polypropylene resin composition, the content ratio of the color masterbatch (C) is in a range of 0.1 to 5 parts by weight, preferably 0.3 to 3 parts by weight, of the color masterbatch (C) based on 100 parts by weight of the total of the moldability improver (A) and the polypropylene resin (B). If the content ratio of the color masterbatch (C) exceeds 5 parts by weight, the polypropylene resin composition undesirably deteriorates in brittle temperature and moldability.

The polypropylene resin composition can be prepared by kneading the above components (A), (B) and optionally (C) with the use of a dry blender, an extruder (e.g. a uniaxial extruder or a biaxial extruder) or a kneader (e.g. a Banbury mixer, a mixing roll or a Brabender plastograph) at a temperature of 180 to 250° C. It is desirable to prepare the polypropylene resin composition by dry blending for ease of molding.

Preferably, the polypropylene resin composition has a melt flow rate MFR of 10 g/10 minutes or higher as determined at 230° C. under a load of 2.16 kg according to ASTM D1238, a bending elastic modulus of 1300 MPa or higher as determined according to JIS K 7203 and an IZOD impact strength of 5 kg/cm$^2$ or higher as determined at −30° C. according to JIS K 7110.

Resin Molded Part

The above polypropylene resin composition can be molded into a desired shape.

There is no particular restriction on the molding method. The molding method can be selected as appropriate depending on the application of the molded part of the polypropylene resin composition. Examples of the molding method are injection molding and extrusion molding. The injection molding is preferred in view of the molding appearance and weld appearance characteristics. It is especially preferable to melt-kneading the moldability improver (A), the polypropylene resin (B), and optionally, the color masterbatch (C) within an injection molding machine, and then, injection-molding the thus-obtained polypropylene resin composition by the injection molding machine.

As the moldability improver (A) is added in a small amount so that the properties of the polypropylene resin composition do not become deteriorated by the moldability improver (A), the polypropylene resin composition is suitably used as a material for large-sized injection-molded parts, in particular, automotive exterior parts such as a bumper, a rocker molding, a side molding, an over fender etc. The polypropylene resin composition is also usable as a molding resin material without causing molding defects even in high-cycle molding.

Although the molded part of the polypropylene resin composition has good appearance and thus can be put into practical use without painting or coating, a portion or the whole of the molded part of the polypropylene resin composition may be painted or coated as needed.

The present invention will be described in more detail by reference to the following examples. It should be however noted that the following examples are only illustrative and not intended to limit the invention thereto.

Experiments

Sample Preparation

Propylene block copolymers (A-1) and (A-2), propylene-ethylene block copolymer (B-1), elastomer (B-2), inorganic filler (B-3) and color masterbatch (C) were prepared. The kinds and properties of the block copolymers (A-1), (A-2) and (B-1) are as indicated in TABLE 1. The elastomer (B-2) was either or both of rubber A: styrene elastomer "KRATON G1652" available from Kraton Polymer Japan Co., Ltd. and rubber B: ethylene elastomer "EBM3011" available from JSR Corp. The inorganic filler (B-3) was talc "C31 (average particle size: 5 μm)" available from Nippon Talc Co., Ltd. The color masterbatch (C) was "LM0094 G01 (low-density polyethylene content: 70 wt %, carbon black content: 30 wt %" available from Toyo Ink Co., Ltd.

TABLE 1

| | Propylene block copolymer | | | | | Melt flow rate MFR g/10 min |
|---|---|---|---|---|---|---|
| | Propylene homopolymer component | | Ethylene-propylene random copolymer component | | | |
| | Component ratio wt % | Melt flow rate MFR g/10 min | Component ratio wt % | Ethylene content wt % | Intrinsic viscosity [η] dl/g | |
| PP: A-1-1 | 90 | 600 | 10 | 30 | 8 | 103 |
| PP: A-1-2 | 92 | 210 | 8 | 40 | 4.5 | 105 |
| PP: A-2-1 | 45 | 35 | 55 | 40 | 5.5 | 0.7 |
| PP: A-2-2 | 45 | 33 | 55 | 40 | 2.1 | 7.3 |
| PP: B-1 | 85 | 155 | 15 | 40 | 3.8 | 40.9 |

Example 1

A polypropylene resin (B) was obtained by blending 65 wt % of the propylene-ethylene block copolymer (PP: B-1), 15 wt % of the rubber B as the elastomer (B-2), 20 wt % of the inorganic filler (B-3), adding 0.1 parts by weight of tetrakis[methylene-3-(3'5'-di-t-butyl-4'-hydroxyphenyl)propionate] methane as an antioxidant (available under the trade name of "Irganox 1010" from Ciba-Geigy, Ltd.) and 0.05 part by weight of tris(2,4-di-t-butylphenyl)phosphite as an antioxidant (available under the trade name of "Irgaphos 168" from Ciba-Geigy, Ltd.) based on 100 part by weight of the total blend of the components (B-1), (B-2) and (B-3), mixing the these components with a Henschel mixer for 5 minutes, and then, kneading and granulating the mixture with a biaxial extruder ("2FCM" manufactured by Kobe Steel, Ltd.) at a temperature setting of 210° C.

A moldability improver (A) was obtained by kneading 90 wt % of propylene block copolymer (PP: A-1-1) as the component (A-1) and 10 wt % of propylene block copolymer (PP: A-2-1) as the component (A-2).

A polypropylene resin composition was then prepared by blending 10 wt % of the moldability improver (A) and 90 wt % of the polypropylene resin (B), adding 2 parts by weight of the color masterbatch (C), 0.1 parts by weight of tetrakis[methylene-3-(3'5'-di-t-butyl-4'-hydroxyphenyl)propionate] methane as an antioxidant (available under the trade name of "Irganox 1010" from Ciba-Geigy, Ltd.) and 0.05 part by weight of tris(2,4-di-t-butylphenyl)phosphite as an antioxidant (available under the trade name of "Irgaphos 168" from Ciba-Geigy, Ltd.) based on the total blend of the moldability improver (A) and the polypropylene resin (B), mixing the these components with a Henschel mixer for 5 minutes, and then, kneading and granulating the mixture with a biaxial extruder ("KCM" manufactured by Kobe Steel, Ltd.) at a temperature setting of 210° C. The respective component ratios of the polypropylene resin composition are as indicated in TABLE 2.

Examples 2-5 and Comparative Examples 1-4

Polypropylene resin compositions were prepared in the same manner as in Example 1 except for the kinds and content ratios of the polymer components. The respective component ratios of the polypropylene resin compositions are as indicated in TABLE 2.

[Evaluation]

In each of Examples 1 to 5 and Comparative Examples 1 to 4, the polypropylene resin composition was tested for a melt flow rate MFR, a bending elastic modulus and an IZOD impact strength. Herein, the melt flow rate MFR was determined at 230° C. under a load of 2.16 kg according to ASTM D1238. The bending elastic modulus and the IZOD impact strength were determined according to JIS K 7203 and JIS K 7110, respectively. The test results are shown in TABLE 2.

Further, the polypropylene resin composition was injection-molded at a molding temperature of 220° C. by an injection molding machine with a mold clamping pressure of 170 tons and a mold film gate width of 2 mm, thereby forming a resin molded sheet with dimensions of 350 mm×105 mm×2 mm. The generation of flow marks on the resin molded sheet was tested by visual inspection to evaluate the appearance of the resin molded sheet as follows in terms of the distance from the film gate to the flow mark generation point.

| | |
|---|---|
| very good (⊚): | up to 80 mm |
| good (○): | over 80 to 130 mm |
| satisfactory (Δ): | over 130 to 180 mm |
| bad (X): | over 180 to 350 mm |

The test results are shown in TABLE 2.

TABLE 2

| Composition | | | | | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|---|---|---|
| Moldability improver (A) | (A-1) | PP (A-1-1) | wt % | 90 | 90 | 90 | 80 | 90 | 90 | — | — | 80 |
| | | PP (A-1-2) | wt % | — | — | — | — | — | — | — | 90 | — |
| | (A-2) | PP (A-2-1) | wt % | 10 | 10 | 10 | 20 | 10 | — | 100 | 10 | — |
| | | PP (A-2-2) | wt % | — | — | — | — | — | 10 | — | — | 20 |
| Polypropylene resin (B) | (B-1) | PP | wt % | 65 | 65 | 65 | 65 | 65 | 60 | 60 | 65 | 60 |
| | (B-2) | Rubber A | wt % | — | — | — | — | 5 | — | — | — | — |
| | | Rubber B | wt % | 15 | 15 | 15 | 15 | 10 | 20 | 25 | 15 | 20 |
| | (B-3) | Talc | wt % | 20 | 20 | 20 | 20 | 20 | 20 | 15 | 20 | 20 |
| Component ratio | | Moldability improver (A) | wt % | 10 | 5 | 3 | 5 | 5 | 10 | 5 | 5 | 10 |
| | | Polypropylene resin (B) | wt % | 90 | 95 | 97 | 95 | 95 | 90 | 95 | 95 | 90 |
| | | Color masterbatch (C) | wt. parts | 2 | 2 | 2 | 2 | 2 | 2 | 2 | 2 | 2 |
| Properties | | Appearance | — | ⊚ | ○ | ○ | ○ | ○ | Δ | X | X | X |
| | | Melt flow rate MFR | g/10 min | 21.7 | 19.5 | 19 | 19.1 | 20.9 | 15.6 | 11.3 | 19.5 | 17.3 |
| | | Bending modulus | MPa | 1640 | 1660 | 1670 | 1610 | 1650 | 1480 | 1200 | 1610 | 1470 |
| | | IZOD impact strength | kg/cm² | 7.6 | 7.8 | 7.8 | 7.9 | 7.7 | 8 | 8.5 | 7.1 | 7 |

It has been shown in TABLE 2 that the polypropylene resin compositions of Examples 1 to 5 had good moldability and molding appearances without property deteriorations.

As described above, the present invention provides an innovative, novel technique by which the polypropylene resin composition attains improved moldability through the combined use of two specific propylene block copolymers (A-1) and (A-2) as the moldability improver (A) in the polypropylene resin (B). The polypropylene resin composition of the present invention is therefore capable of preventing molding defects such as flow marks and voids for improvement in molding appearance without material cost increase and property deterioration etc.

The entire contents of Japanese Patent Application No. 2006-352451 (filed on Dec. 27, 2006) are herein incorporated by reference.

Although the present invention has been described with reference to the above-specific embodiment of the invention, the invention is not limited to this exemplary embodiment.

Various modification and variation of the embodiment described above will occur to those skilled in the art in light of the above teachings. The scope of the invention is defined with reference to the following claims.

What is claimed is:

1. A process of producing a polypropylene resin composition, comprising:
   preparing a moldability improver (A) and a polypropylene resin (B) separately; and
   blending 2 to 15 wt % of the moldability improver (A) and 85 to 98 wt % of the polypropylene resin (B) based on the total weight of the polypropylene resin composition,
   the moldability improver (A) containing 80 to 95 wt % of a propylene block copolymer (A-1) and 5 to 20 wt % of a propylene block copolymer (A-2) based on the total weight of the moldability improver (A),
   the propylene block copolymer (A-1) including 80 to 95 wt % of a crystalline propylene polymer component (A-11) and 5 to 20 wt % of a propylene-ethylene random copolymer component (A-12) based on the total weight of the propylene block copolymer (A-1) and satisfying the following properties: (a-11) the crystalline propylene polymer component (A-11) has a melt flow rate of 300 g/10 minutes or higher; (a-12) the propylene-ethylene random copolymer component (A-12) has an ethylene content of 20 to 70 wt %; (a-13) the propylene-ethylene random copolymer component (A-12) has an intrinsic viscosity of 6.5 dl/g or higher; and (a-14) the propylene block copolymer (A-1) has an overall melt flow rate of 80 g/10 minutes or higher,
   the propylene block copolymer (A-2) including 30 to 65 wt % of a crystalline propylene polymer component (A-21) and 35 to 70 wt % of a propylene-ethylene random copolymer component (A-22) based on the total weight of the propylene block copolymer (A-2) and satisfying the following properties: (a-21) the crystalline propylene polymer component (A-21) has a melt flow rate of 20 g/10 minutes or higher; (a-22) the propylene-ethylene random copolymer component (A-22) has an ethylene content of 20 to 70 wt %; (a-23) the propylene-ethylene random copolymer component (A-22) has an intrinsic viscosity of 4.0 to 9.0 dl/g or higher; and (a-24) the propylene block copolymer (A-2) has an overall melt flow rate of 0.1 to 79 g/10 minutes,
   the polypropylene resin (B) containing 55 to 85 wt % of a propylene-ethylene block copolymer (B-1), 5 to 20 wt % of at least one of an ethylene elastomer and a styrene elastomer, (B-2) and 10 to 25 wt % of an inorganic filler (B-3) based on the total weight of the polypropylene resin (B),
   the propylene-ethylene block copolymer (B-1) including less than 35 wt % of a propylene-ethylene random copolymer, component (B-12) based on the total weight of the propylene-ethylene block copolymer (B-1),
   the inorganic filler (B-3) being either talc, mica, glass fiber or whisker.

2. The process according to claim 1, wherein the blending comprises adding the moldability improver (A) as a resin masterbatch into the polypropylene resin (B) at the stage of molding of the polypropylene resin composition.

3. The process according to claim 1, further comprising: adding 0.1 to 5 parts by weight of a color masterbatch (C) based on 100 parts by weight of the total of the moldability improver (A) and the polypropylene resin (B).

4. The process according to claim 3, wherein the color masterbatch (C) contains polyethylene wax as a carrier polymer and carbon black as a colorant.

5. A process for producing a molded part of the polypropylene resin composition according to claim 1, comprising:
   melt-kneading the moldability improver (A) and the polypropylene resin (B) within an injection molding machine, thereby yielding the polypropylene resin composition;
   injection-molding the polypropylene resin composition by the injection molding machine.

6. The process according to claim 1, wherein said blending is performed at 180 to 250° C.

* * * * *